US012098826B2

(12) United States Patent
Lan et al.

(10) Patent No.: US 12,098,826 B2
(45) Date of Patent: Sep. 24, 2024

(54) POOL LINER WITH LED LIGHT STRINGS

(71) Applicant: POLYGROUP MACAU LIMITED (BVI), Tortola (VG)

(72) Inventors: Chaolong Lan, Shenzhen (CN); Victor Hugo Ocegueda Gallaga, Tijuana (MX)

(73) Assignee: Polygroup Macau Limited (BVI), Road Town (VG)

( * ) Notice: Subject to any disclaimer, the term of this patent is extended or adjusted under 35 U.S.C. 154(b) by 0 days.

(21) Appl. No.: 18/499,102

(22) Filed: Oct. 31, 2023

(65) Prior Publication Data

US 2024/0060627 A1 Feb. 22, 2024

Related U.S. Application Data

(63) Continuation of application No. 17/161,362, filed on Jan. 28, 2021, now Pat. No. 11,841,130, which is a continuation of application No. 15/825,843, filed on Nov. 29, 2017, now Pat. No. 10,935,220.

(60) Provisional application No. 62/427,519, filed on Nov. 29, 2016.

(51) Int. Cl.

| | |
|---|---|
| ***F21V 21/08*** | (2006.01) |
| ***E04H 4/14*** | (2006.01) |
| ***F21S 4/20*** | (2016.01) |
| ***F21V 23/00*** | (2015.01) |
| ***F21V 31/00*** | (2006.01) |
| *F21W 131/401* | (2006.01) |
| *F21Y 103/10* | (2016.01) |
| *F21Y 115/10* | (2016.01) |

(52) U.S. Cl.

CPC ............... *F21V 21/08* (2013.01); *E04H 4/14* (2013.01); *E04H 4/148* (2013.01); *F21S 4/20* (2016.01); *F21V 23/003* (2013.01); *F21V 31/005* (2013.01); *F21W 2131/401* (2013.01); *F21Y 2103/10* (2016.08); *F21Y 2115/10* (2016.08)

(58) Field of Classification Search

CPC ...... F21V 21/08; F21V 23/003; F21V 31/005; F21S 4/20; E04H 4/14

USPC .......................................................... 362/221

See application file for complete search history.

(56) References Cited

U.S. PATENT DOCUMENTS 4,183,184 A * 1/1980 Sargent .................. E04H 15/22 135/118
5,107,551 A 4/1992 Weir et al.
5,410,459 A 4/1995 Yang
(Continued)

FOREIGN PATENT DOCUMENTS

DE 200501211720/ 10/2005
DE 2020/09013588 2/2010
DE 2020/10003733 9/2010

OTHER PUBLICATIONS 17204088.3 European Search Report dated May 7, 2018.

*Primary Examiner* — Michael G Lee
*Assistant Examiner* — David Tardif
(74) *Attorney, Agent, or Firm* — FINNEGAN, HENDERSON, FARABOW, GARRETT & DUNNER LLP

(57) ABSTRACT

Embodiments of the present disclosure provide systems and methods for attaching pool accessories, such as LED light strings, to a pool liner. The systems and methods for attaching pool accessories can comprise a re-sealable pocket attached to a pool liner where the re-sealable pocket can hold a LED light string or another pool accessory.

20 Claims, 11 Drawing Sheets
(9 of 11 Drawing Sheet(s) Filed in Color)

(56) References Cited

U.S. PATENT DOCUMENTS

| | | | | |
|---|---|---|---|---|
| 5,720,056 | A | 2/1998 | Aymes | |
| 5,915,848 | A | 6/1999 | Deason | |
| 6,199,223 | B1 | 3/2001 | Sorokin | |
| 6,725,469 | B2 | 4/2004 | Coates | |
| 7,448,768 | B2 | 11/2008 | Sloan et al. | |
| 7,578,596 | B2 | 8/2009 | Martin | |
| 2009/0094734 | A1 * | 4/2009 | Diebel | F21S 8/00 4/506 |
| 2009/0151065 | A1 * | 6/2009 | Watson | E04H 4/106 4/503 |
| 2014/0007338 | A1 * | 1/2014 | Shpringer | E04H 4/082 4/498 |
| 2016/0047516 | A1 | 2/2016 | Taylor | |
| 2017/0067268 | A1 | 3/2017 | Tong et al. | |

* cited by examiner

POOL LINER WITH LED LIGHT STRINGS

CROSS-REFERENCE TO RELATED APPLICATIONS

This application claims the benefit, under 35 U.S.C. § 120 to U.S. patent application Ser. No. 17/161,362, filed on 28 Jan. 2021 and U.S. patent application Ser. No. 15/825,843, filed on 29 Nov. 2017, and claims the benefit, under 35 U.S.C. § 119(e) of U.S. Provisional Patent Application No. 62/427,519 filed on 29 Nov. 2016, the entire content and substance of which are incorporated herein by reference as if set forth in their entirety.

FIELD OF THE INVENTION

The presently disclosed subject matter generally relates to systems and methods for attaching pool accessories, such as LED lights and light strings, to a pool liner.

BACKGROUND

A variety of above-ground pools are known. Some designs, for example, are inflatable and have hollow inflatable side walls that can contain water. Another type of above-ground pool is a frame pool. Traditionally, frame pools are constructed of a rigid structure or frame composed of steel or aluminum. Such rigid frames provide support to a large water container, or pool liner, made of any flexible material capable of retaining water. Once in place, the assembly creates a solid structure capable of holding a large amount of water. Over time, however, the hydrostatic load from the water causes the liner to stretch and deform making secure attachment of any accessory, such as a pool light or light string, particularly challenging.

Known pool light attachment mechanisms generally are designed for below-ground pools or more permanent above-ground pools (i.e., those not constructed from a rigid frame and a flexible liner). For example, certain designs provide for lights that are embedded within the pool structure itself and are nearly impossible to remove without draining the entire pool. Other known pool lighting systems attach to a top edge of the pool frame and hang above the water. These systems can be problematic as they can be more expensive and do not provide uniform lighting in the pool. Additionally, many known pool lights are incapable of secure attachment onto the pool liner of an above-ground pool, again due to the effects of the hydrostatic load on the pool liner.

SUMMARY

Briefly described, embodiments of the presently disclosed subject matter relate to systems and methods for attaching pool accessories, such as LED lights and light strings, to a pool liner. In some embodiments, an above-ground pool can include a liner having one or more re-sealable pockets attached thereto. In some embodiments, the one or more re-sealable pockets are attached such that they substantially conform about the perimeter of the pool. As such, the one or more re-sealable pockets can be attached to an interior surface of the liner, an exterior surface of the liner, or both, as desired. The above-ground pool can be any shape, including circular or rectangular, and in some embodiments, the pool's liner can form a unitary side wall having only one seam (e.g., a vertical seam).

In some embodiments, the re-sealable pocket can comprise a first strip and a second strip attached to the liner. The first strip can comprise a first re-sealable zip-style closure, and the second strip can comprise a second re-sealable zip-style closure. When in a coupled position, the first and second re-sealable zip-style closures can mate together to form a channel of the re-sealable pocket.

In some embodiments, the re-sealable pocket can instead comprise a strip attached to the liner. The strip can have a first edge and a second edge each having a re-sealable zip-style closure. The strip can be folded in half about a central line such that the first edge and the second edge align thus allowing the re-sealable zip-style closures on the first and second edges can be coupled together via a zipper mechanism.

In some embodiments, when in a coupled state, the re-sealable pocket can substantially seal to form a channel. The channel can house one or more pool accessories, such as an LED light or light string, that can be inserted within the channel. Likewise, the one or more pool accessories can be removable from the channel when the re-sealable pocket is in an uncoupled state.

The foregoing summarizes only a few aspects of the presently disclosed subject matter and is not intended to reflect the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

DETAILED DESCRIPTION

Figure 1A:
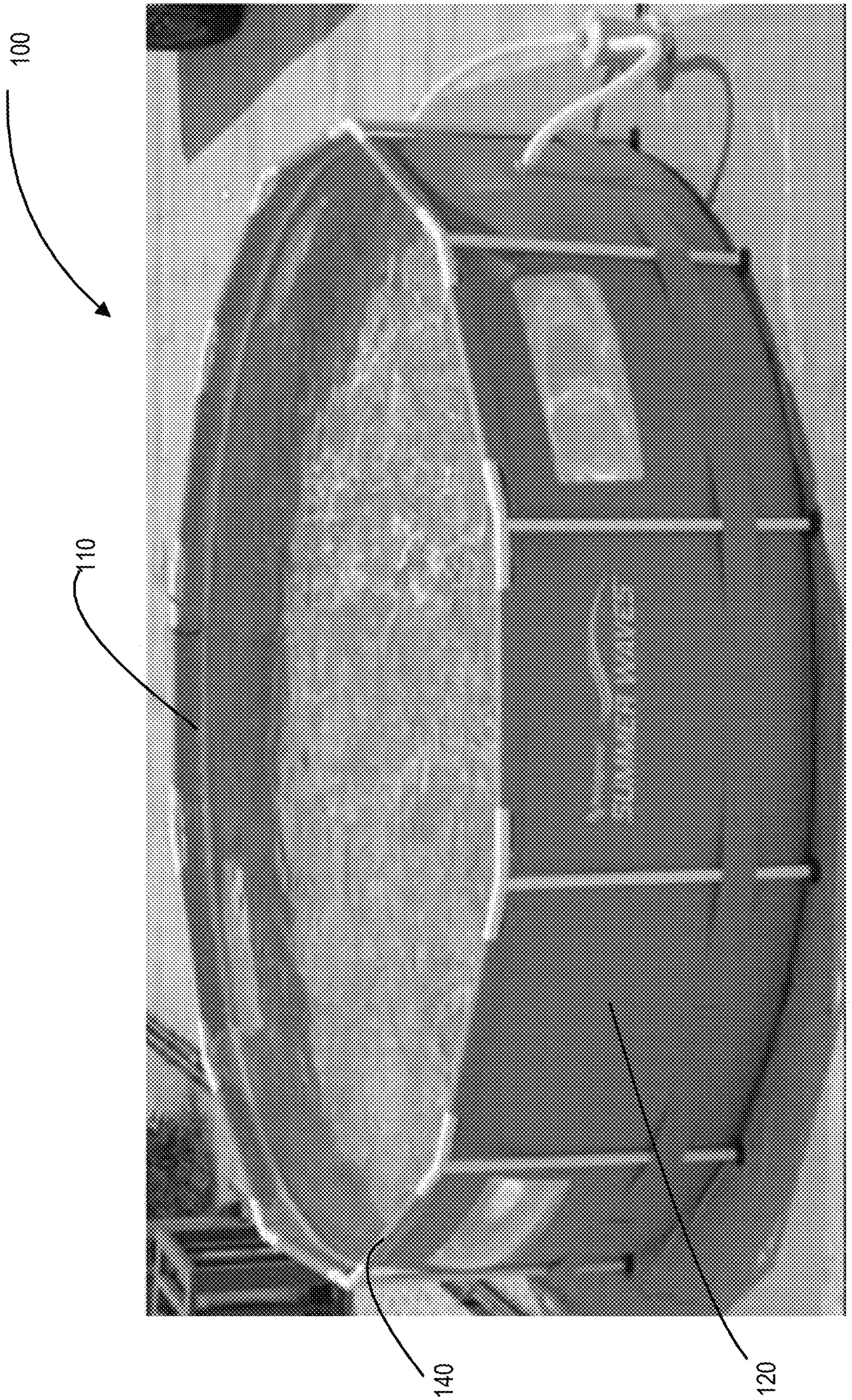
FIGS. 1A and 1B illustrate an above-ground pool having a re-sealable pocket for a pool accessory such as an LED light string according to some embodiments of the present disclosure.

As described herein, embodiments of the disclosed technology include systems and methods for attaching pool accessories, such as LED light strings, to a pool liner. An above-ground pool can include a liner comprising one or more re-sealable pockets attached thereto. The re-sealable pockets can be designed so that LED light strings can be inserted therein to provide lighting in or around an above ground swimming pool. As will be appreciated, having re-sealable pockets allows the LED light strings or other pool accessories to be changed without relative ease (e.g., without draining the entire pool). For example, a user could change out the LED light string of one color and replace it with an LED light string having another color depending on the theme of party. In some embodiments, the one or more re-sealable pockets can be attached to an interior surface of the liner, an exterior surface of the liner, or both, as desired.

The various embodiments of the presently disclosed subject matter are described with specificity to meet statutory requirements. But the description itself is not intended to limit the scope of this disclosure. Rather, it has been contemplated that the claimed subject matter might also be embodied in other ways, to include different steps or elements similar to the ones described in this document, in conjunction with other present or future technologies.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosed technology are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

To facilitate an understanding of the principles and features of the invention, various illustrative embodiments are explained below. In particular, the presently disclosed subject matter is described in the context of systems and methods for attaching pool accessories, such as LED lights and light strings, to a pool liner.

Figure 1B:
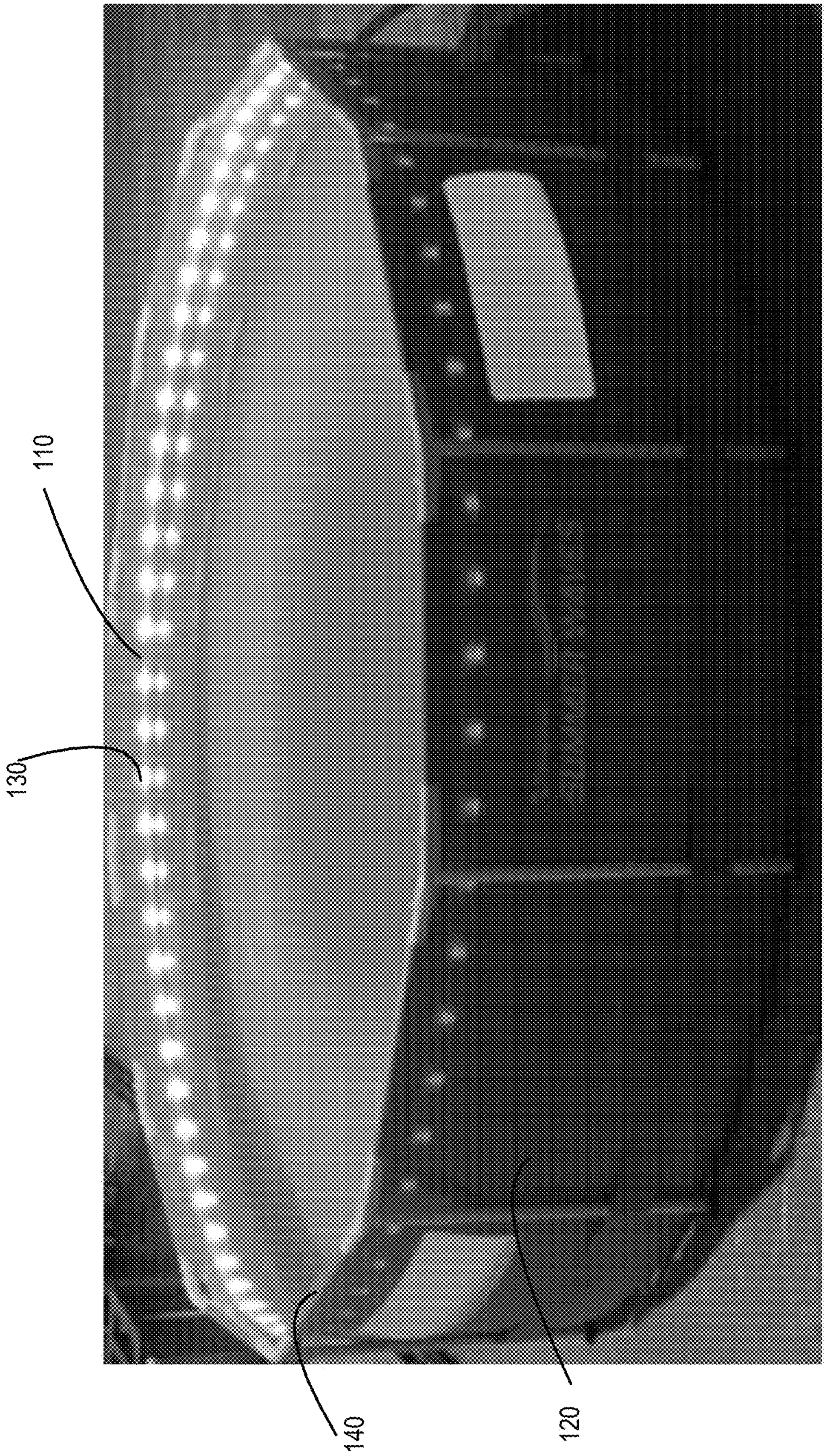

Referring now to the figures, wherein like reference numerals represent like parts throughout the views, the pool liner will be described in detail. FIGS. 1A and 1B illustrate an above-ground swimming pool according to some embodiments of the present disclosure. Specifically, FIGS. 1A and 1B show an above-ground swimming pool 100 having a liner 120 with a re-sealable pocket 110 attached thereto. Additionally, as shown in FIG. 1B, the re-sealable pocket 110 can optionally house one or more LED light strings 130. In some embodiments, and as shown in FIGS. 1A and 1B, the re-sealable 110 pocket can optionally be attached proximate a top edge 140 of the liner 120, so as to illuminate around the perimeter of the above-ground pool.

It is understood that any number of re-sealable pockets can be attached to the liner at various positions. For example, one or more re-sealable pockets can be attached to an exterior surface of the liner, an interior surface of the liner, or a combination thereof. In another embodiment, one or more re-sealable pockets can be attached parallel to each other around the perimeter of the pool, thereby providing multiple layers of illumination. Additionally, in other embodiments, multiple re-sealable pockets can be located at various positions around the pool to provide illumination in some spots and not others.

Once the pool is constructed, the liner provides a container to be filled with water. In some embodiments, the liner can comprise a single sheet of material adhered together at a unitary, vertical seam. Likewise, in some embodiments, the re-sealable pocket can span uniformly around the perimeter of the pool, thereby conforming to the pool shape, as illustrated in FIGS. 1A and 18. Additionally, in some embodiments, the two terminal ends of the strip can optionally be adhered proximate or adjacent to the unitary seam. In other embodiments, multiple re-sealable pockets can span the entire perimeter or a portion of the perimeter of the pool.

Additionally, it is understood that the pool, once constructed, can be a variety of shapes including, but not limited to, rectangular, circular, oval, or square. Further it is understood that the liner can be any flexible material capable of retaining water. Such flexible materials can comprise, for example, PolyLaminate™ PVC. In some embodiments, the PolyLaminate™ PVC can optionally have polyester inner mesh sidewalls. The flexible materials can also comprise POLYSTRENGTH™ PVC, optionally triple-layer POLYSTRENGTH™ PVC. In other embodiments, the flexible materials can be various polymers, plastics, composites and/or other materials such as polyurethane, PVC, nylon, or other materials known in the art. Additionally, such materials can optionally be bonded with another material so as to retain water. Otherwise, such materials can be treated to hold water with polyurethane, PVC, vinyl, or other suitable impermeable lining to provide the desirable water-proof qualities.

Figure 2A:
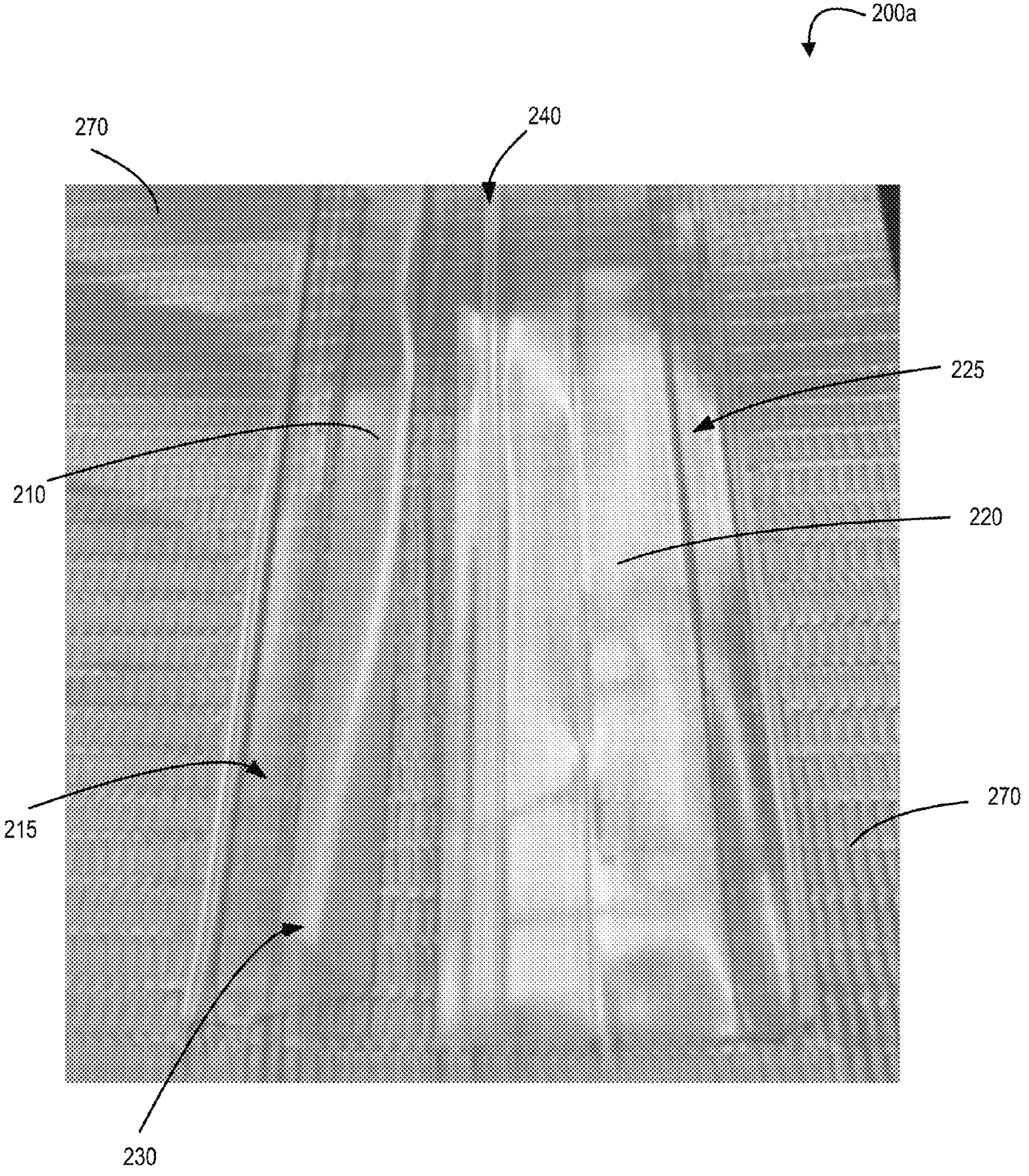
FIGS. 2A and 2B illustrates a re-sealable pocket in an uncoupled and coupled state, respectively, according to some embodiments of the present disclosure.
Figure 2B:
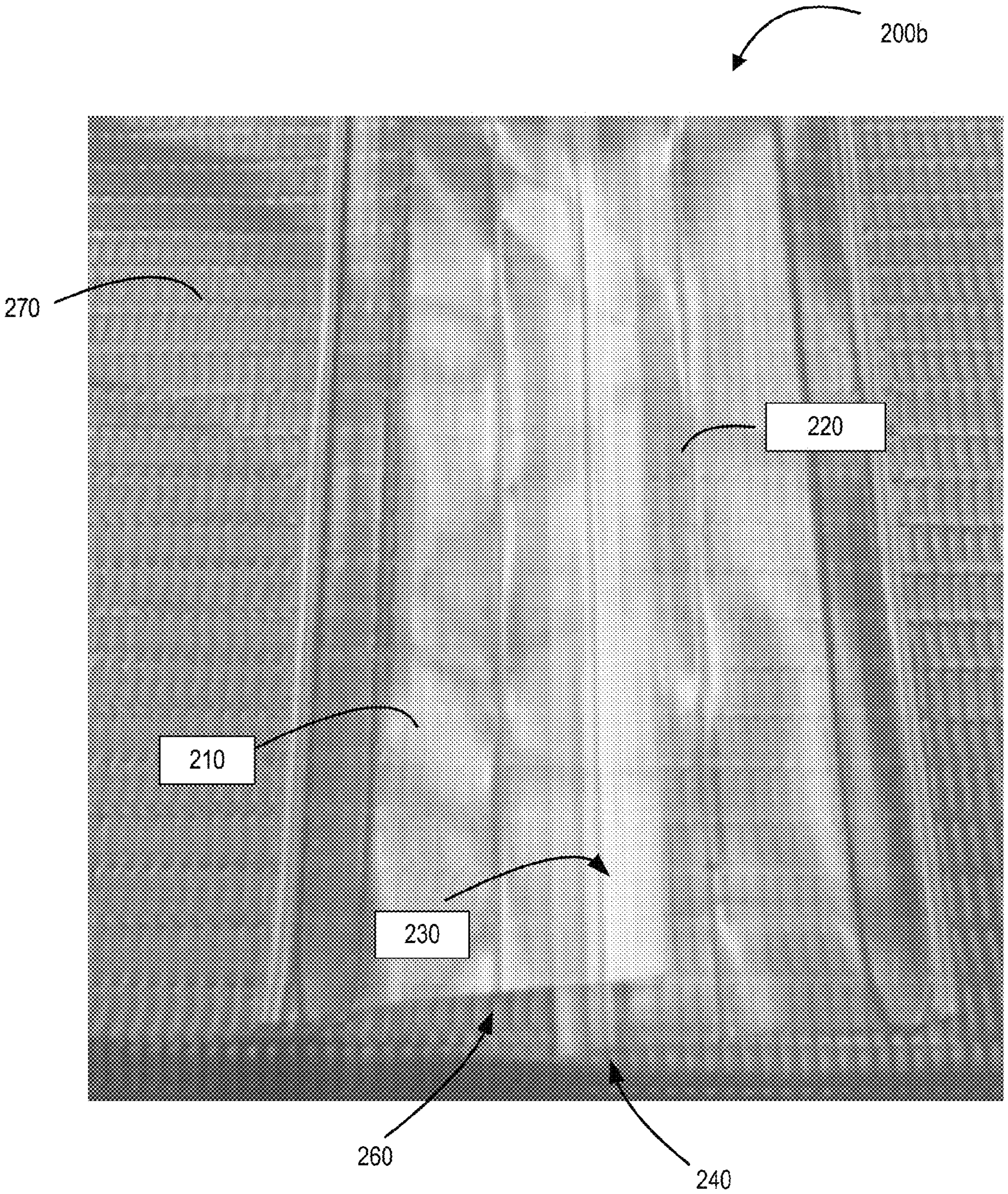

As will be appreciated, the re-sealable pocket can provide a flexible, safe, and secure method for attaching one or more pool accessories, such as a LED light string, to the pool liner. Specifically, the re-sealable pocket can permit easy attachment of a LED light string to the liner and allow for attaching or detaching the accessory regardless of the pool state (e.g., filled with water or empty). FIG. 2 illustrates a re-sealable pocket in an uncoupled 200*a* and coupled 200*b* state, respectively, in accordance with some embodiments of the present disclosure. In some embodiments, the re-sealable pocket comprises a first strip 210 and a second strip 220. The first strip 210 can comprise a first zip-style connector 230, and the second strip 220 can comprise a second zip-style connector 240.

The re-sealable pocket can be attached to the liner 270 in a variety of ways so as to provide a water-resistant seal. For example, the strips 210, 220 can be bonded, glued, or otherwise adhered to the liner 270. In some embodiments, the first strip 210 is bonded to liner 270 at edge 215, and the second strip 220 is bonded to liner 270 at edge 225 and parallel to the first strip 210. Therefore, when the first strip 210 is coupled with the second strip 220, as shown in FIC 2, the unbonded edge of the first strip 210 overlaps with the unbonded edge of the second strip, thereby allowing the two strips to couple and form the re-sealable pocket 200*b*.

Figure 5A:
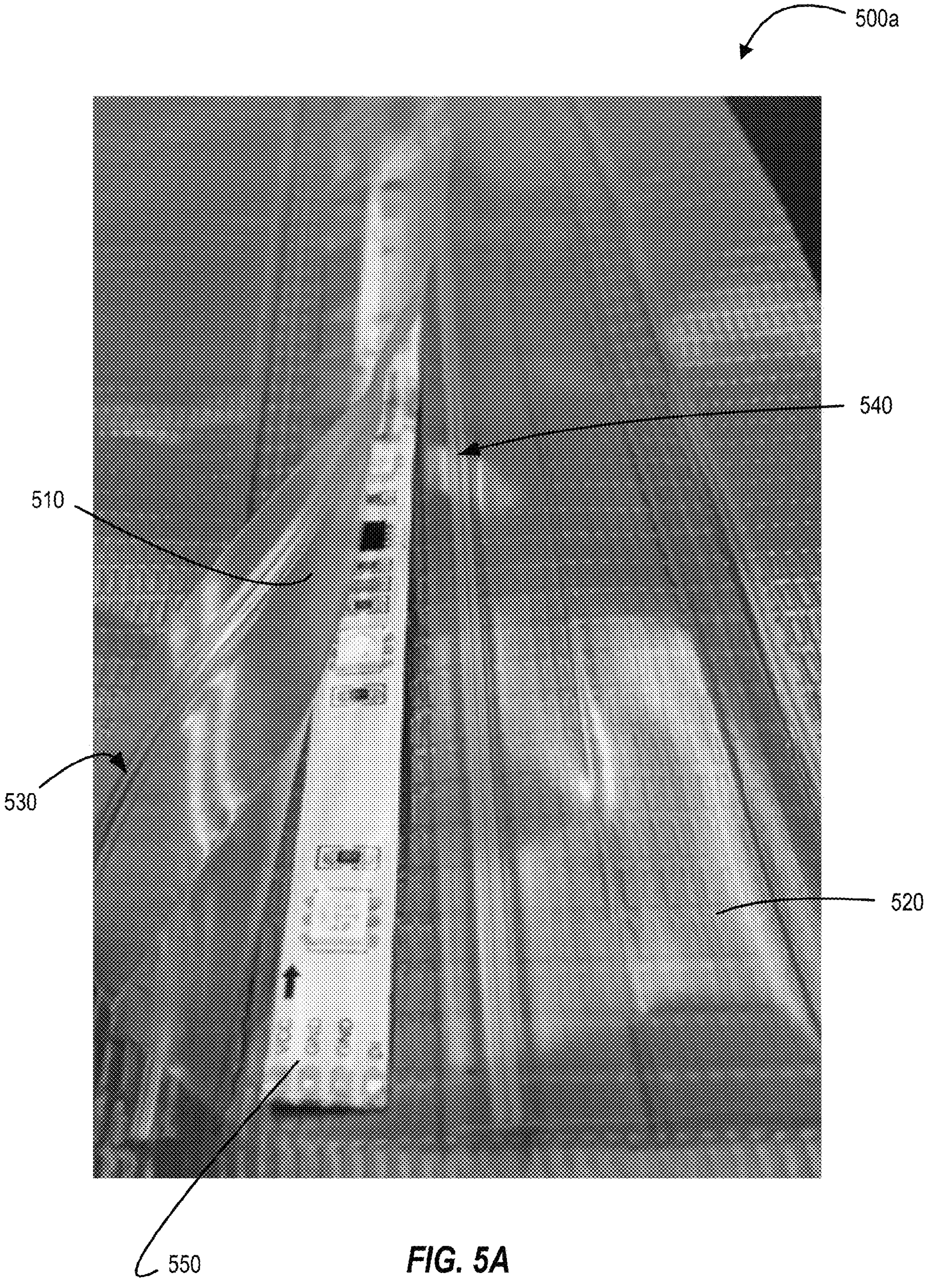
FIGS. 5A and 5B illustrate a re-sealable pocket having an LED light string inserted therein according to some embodiments of the present disclosure.
Figure 5B:
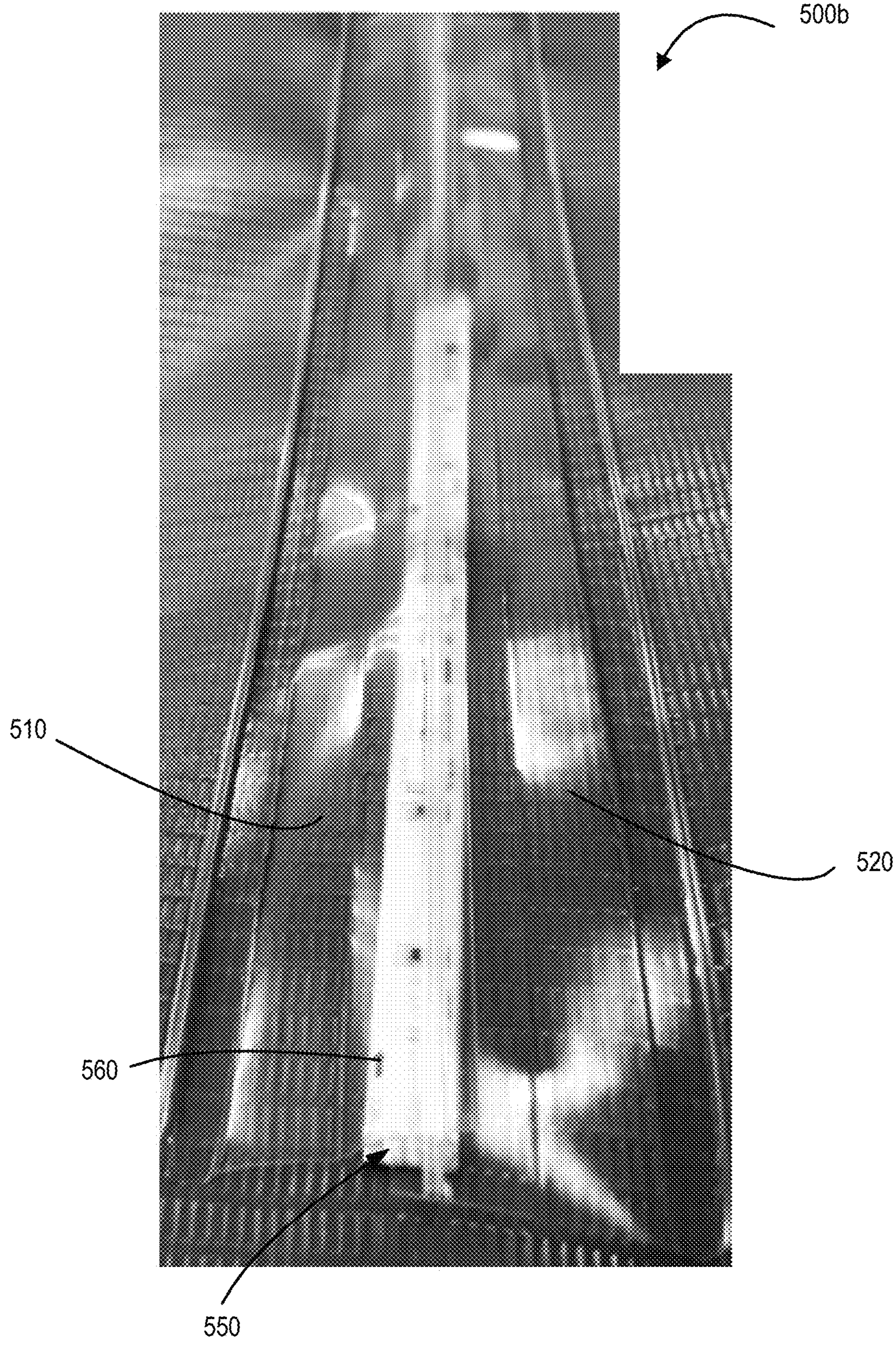

To close the re-sealable pocket, and therefore seal a pool accessory therein, the first zip-style connector 230 can be mated with the second zip-style connector 240. When in a coupled state 200*b*, the first and second zip-style connectors 230, 240 can form a channel 260 for inserting various pool accessories, and optionally an LED light string, as illustrated in FIGS. 5A and 5B.

Figure 3:
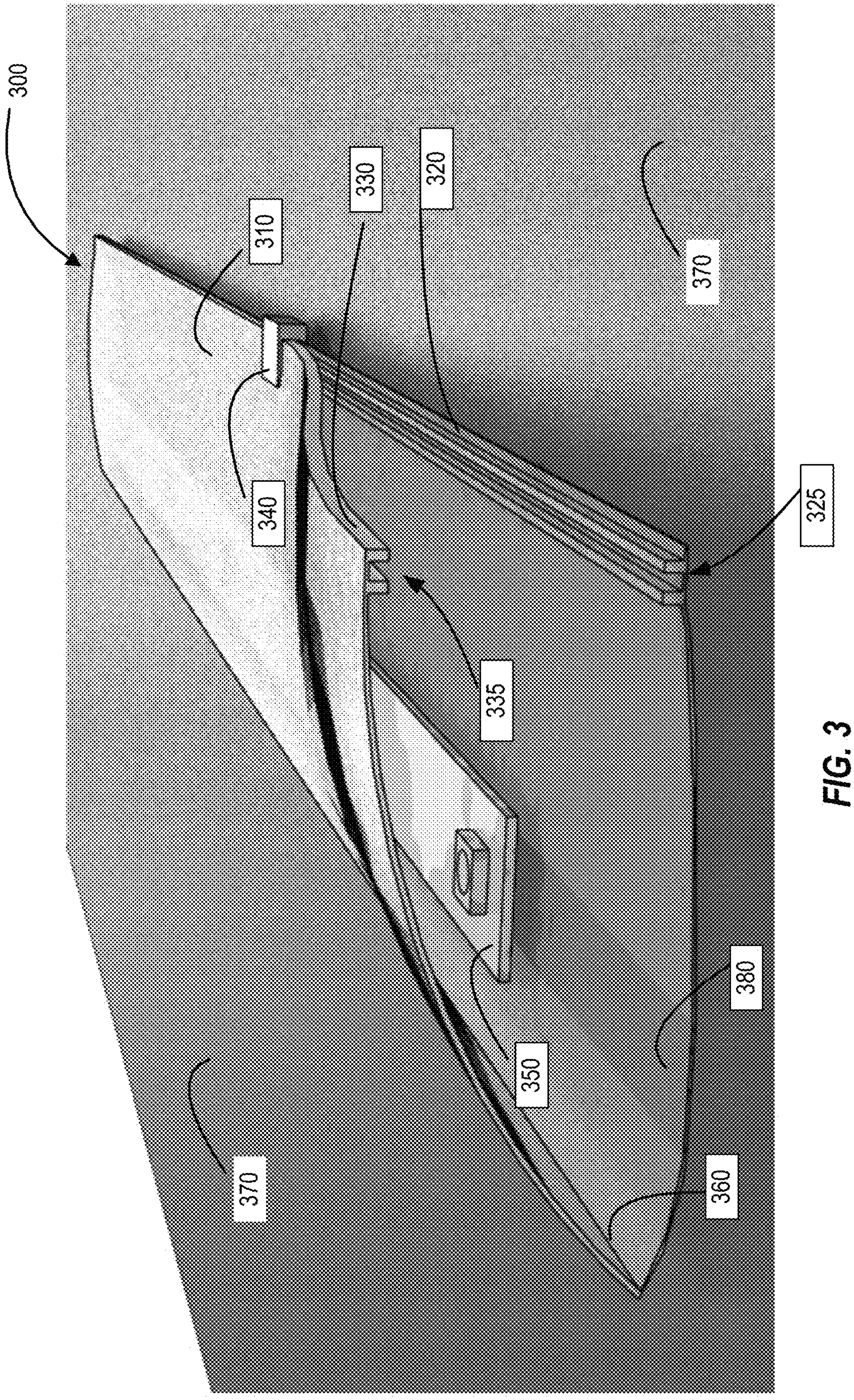
FIG. 3 illustrates a re-sealable pocket comprising a zipper mechanism according to some embodiments of the present disclosure.

FIG. 3 illustrates another exemplary re-sealable pocket 300, in accordance with some embodiments of the present disclosure. In some embodiments, the re-sealable pocket 300 can comprise a strip 310 having a first edge 320 and a second edge 330. The first edge 320 can comprise a first zip-style connector 325, and the second edge 330 can comprise a second zip-style connector 335. The first and second zip-style connectors 325, 335 can be coupled using a zipper mechanism 340 to create a channel for inserting one or more pool accessories therein, such as a LED light string 350.

To close the re-sealable pocket and therefore seal a pool accessory within, the strip 310 can be folded in half about a central line 360, and the first and second edges 320, 330 can be brought proximate one another. Following, the first and second edges 320, 330 can be zipped together via the zipper mechanism 340, which can cause the first and second zip-style connectors 325, 335 to couple along the length of the strip. When in a coupled state, the strip can form a channel for inserting various pool accessories, and optionally an LED light string 350, as illustrated further in FIGS. 6A and 6B.

The re-sealable pocket can be attached to the liner 370 in a variety of ways so as to provide a water-resistant seal. For example, the strip 310 can be bonded, welded, glued, or otherwise adhered to the liner proximate a middle portion 380 of the folded strip, as illustrated in FIG. 3. In some embodiments, the folded, strip 310 can be adhered across its entire length, to uniformly attach the strip to the liner 370.

Figure 4A:
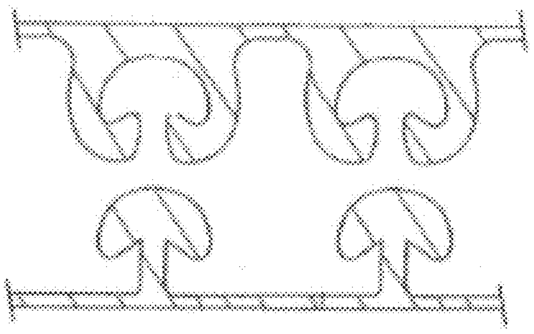
FIGS. 4A-4C illustrate various zip-style enclosures and zipper mechanisms for sealing a re-sealable pocket according to some embodiments of the present disclosure.
Figure 4B:
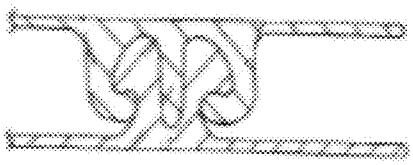
Figure 4C:
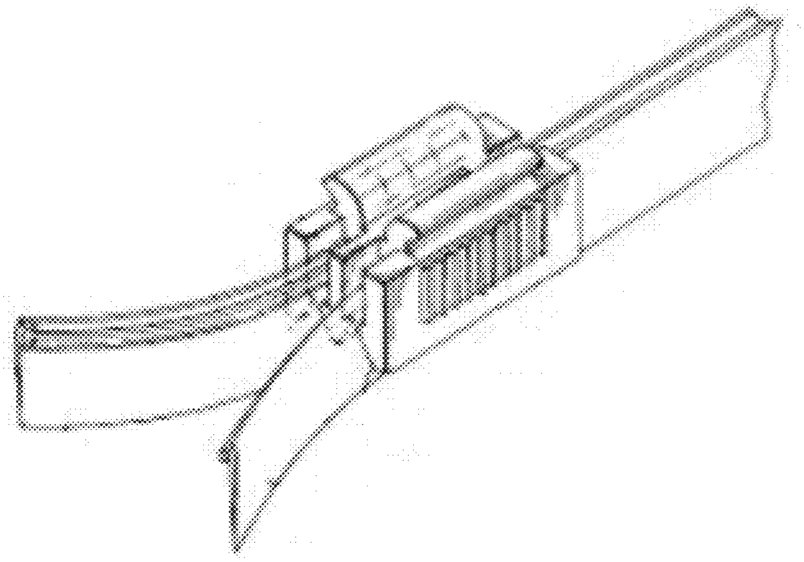

It is understood that the re-sealable pocket can be sealed via various connectors. FIGS. 4A-4C illustrate some example connectors according to embodiments of the present disclosure. In some embodiments, the first strip and the second strip, illustrated in FIG. 2A, can comprise a zip-lock connector as shown in FIGS. 4A and 4B. For instance, the first zip-style connector 230 can comprise one or more complementary protrusions that can be locked with the second zip-style connector 240 and zipped together or connected together via other suitable means. Additionally, in other embodiments, and as illustrated at FIG. 3, the re-sealable pocket can be sealed via a conventional zipper mechanism as shown at FIG. 4C.

The re-sealable pocket can be constructed from a variety of flexible materials. In some embodiments, the re-sealable pocket can comprise a transparent or translucent material so as to allow light to emanate from within the channel. In some embodiments, the re-sealable pocket can be constructed from any flexible material that can weld or bond easily with the pool liner material. For instance, a re-sealable pocket constructed from PVC can easily weld to a pool liner constructed from PVC. Additionally, in some embodiments, the material is water-resistant.

As illustrated in FIGS. 5A and 5B, in some embodiments, an LED light string 550 can be inserted within the open re-sealable pocket 500*a* and sealed within the closed re-sealable pocket 500*b*. The light string 550 can fit underneath the first strip 510 and the second strip 520, and when the first strip 510 and second strip 520 are coupled together, the LED light string 550 can sit within the channel 560 as illustrated in FIG. 5B. It is understood that the re-sealable pocket can accommodate a variety of pool accessories.

Figure 6B:
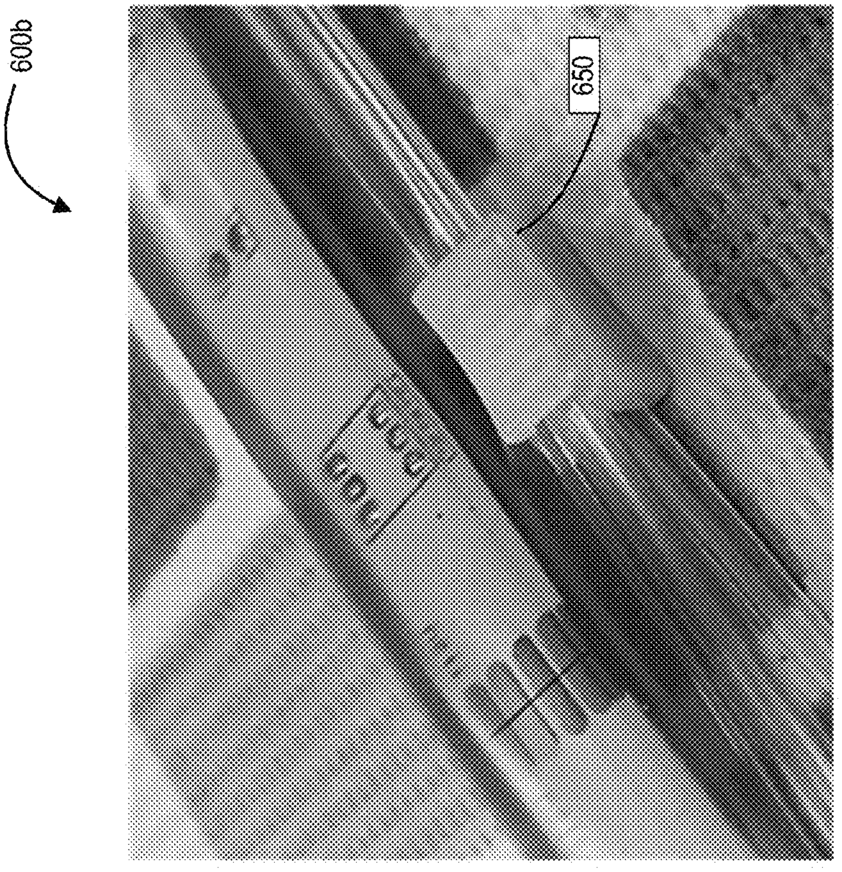
FIGS. 6A and 6B illustrate a re-sealable pocket having an LED light string inserted therein and comprising a zipper mechanism according to some embodiments of the present disclosure.
Figure 6A:
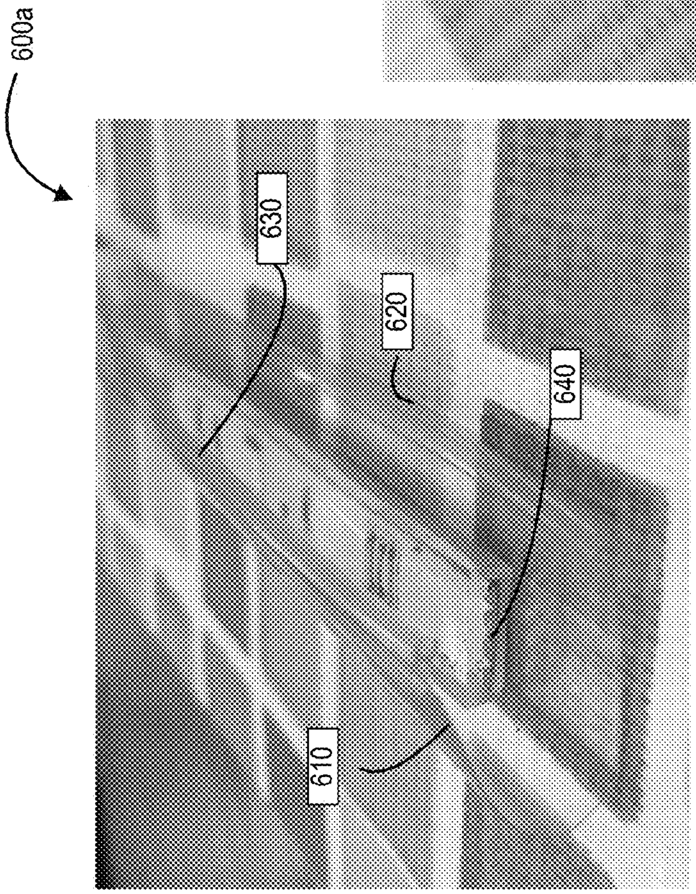

As illustrated in FIGS. 6A and 6B, in some embodiments, an LED light string can be inserted within an open re-sealable pocket 600*a* and sealed within the closed re-sealable pocket 600*b*. The light string can fit within a folded strip 610, and a first edge 620 and a second edge 630 of the folded strip 610 can be coupled together via a zipper mechanism 650 to seal an LED light string 640 within the re-sealable pocket 600*b*.

Figure 7:
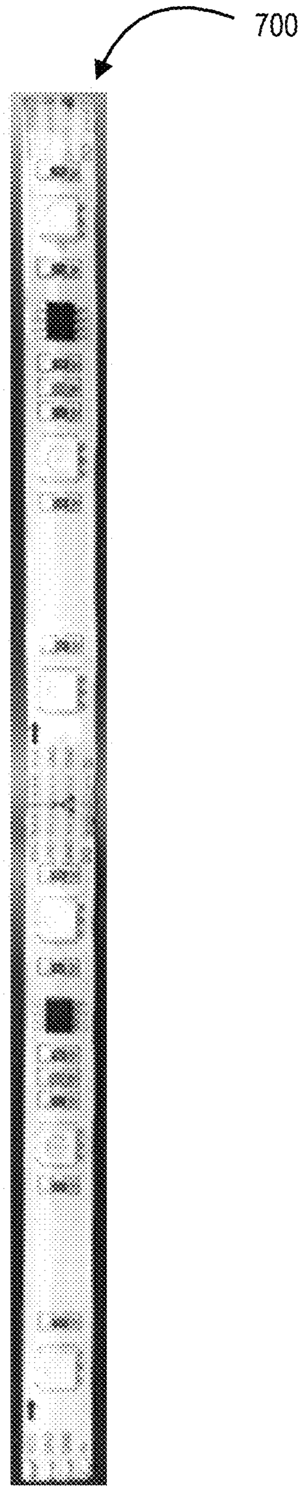
FIG. 7 is an LED light string according to some embodiments of the present disclosure.
Figure 8:
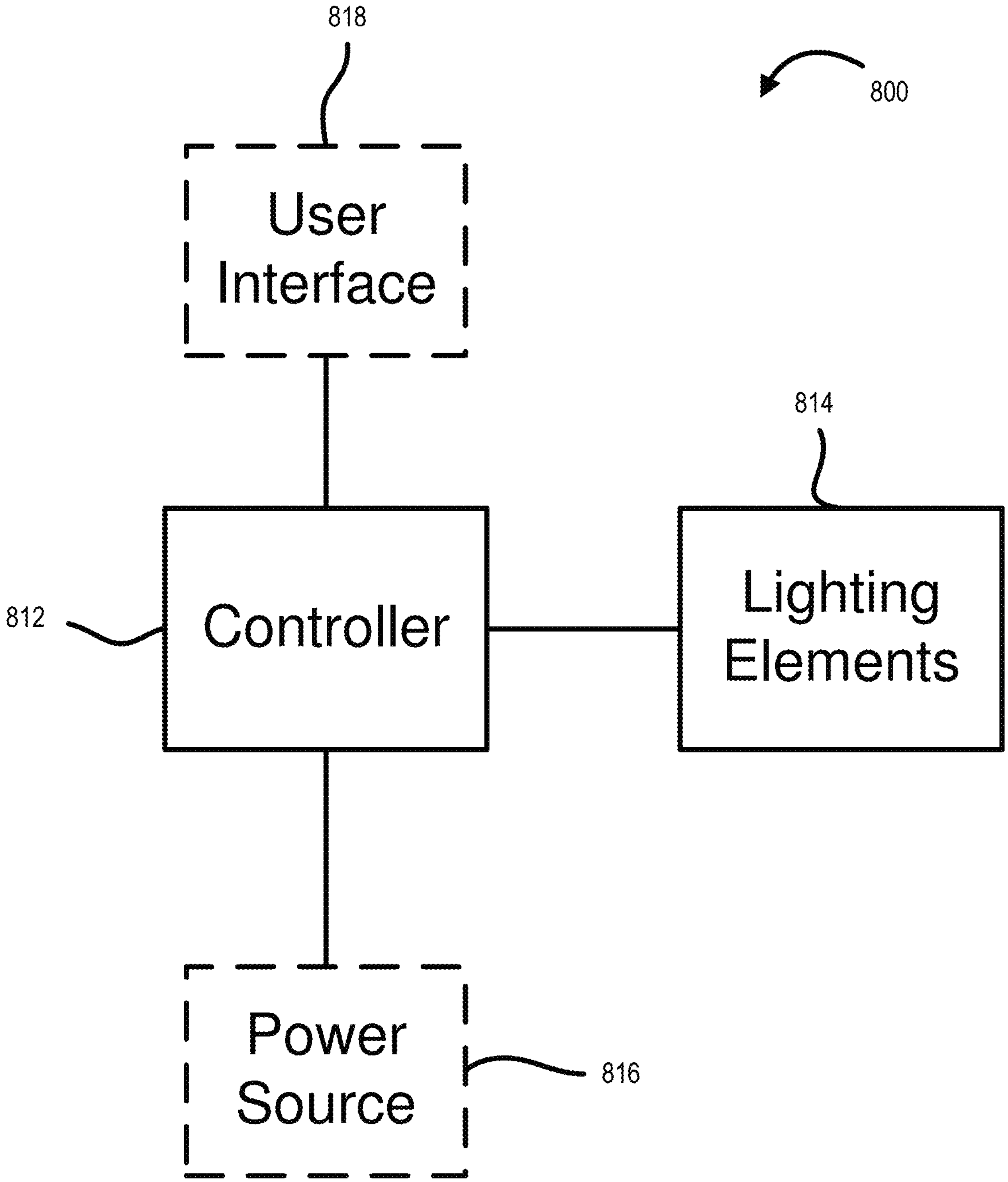
FIG. 8 is a block diagram illustrating the various components of an LED light string system according to some embodiments of the present disclosure.

FIG. 7 illustrates an exemplary LED light string. Light string 700 may comprise a plurality of light-emitting diodes (LEDs). FIG. 8 is a block diagram illustrating the various components of an LED light string system 800 according to some embodiments of the present disclosure. In some embodiments, an LED light string system 800 can generally comprise a power source 816 connected to a controller 812, which can be connected to one or more lighting elements 814. In some embodiments, the controller 812 may optionally be connected with a user interface 818, which can allow user control of the one or more lighting elements 814 (e.g., LEDs). For example, in some embodiments, the user interface 818 can allow a user to control the color or intensity of the LEDs. Further, the user interface 818 may allow the user to control various lighting patterns produced by the LEDs. In some embodiments, the lighting elements 814 may be disposed in groups or channels on a printed circuit board (PCB).

According to some embodiments, the lighting elements 814 can be a plurality of LEDs, and the controller 812 can include one or more LED drivers. Thus, in some embodiments, the one or more LED drivers can control an intensity of the light emitted by the plurality of LEDs through pulse-width modulation of one or more currents supplied to the plurality of LEDs. According to some embodiments, the one or more LED drivers can separately control currents supplied to the different groups or channels of the plurality of LEDs through pulse-width modulation. Further, in some embodiments, the controller 812 can control a color of the plurality of LEDs through pulse-width modulation. Although the controller 812 has been described with reference to one or more LED drivers controlling a plurality of LEDs through pulse-width modulation, one of ordinary skill will recognize that, in various embodiments, alternative elements and methods may be used by the controller 812 to control the lighting elements 814.

According to some embodiments, the power source 816 may include one or more batteries, According to some embodiments, power may be supplied from an external power source 816, such as a wall outlet. In further embodiments, power may be supplied through a hardwire connection to a power grid. As noted previously, the controller 812 may control the lighting elements 814 to produce a flickering light effect by controlling an amount of power provided to the lighting elements 814, such power being received from the power source 816.

In example implementations of the disclosed technology, a controller 812 may include any number of hardware and/or software applications that are executed to facilitate any of the operations. In example implementations, one or more I/O interfaces may facilitate communication between the controller 812 and one or more input/output devices (i.e., lighting elements 814, power source 816, or user interface 818). For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the controller 812 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. In particular, aspects of the present disclosure have been described as relating to systems and methods for attaching pool accessories, such as LED light strings, to a pool liner. Additionally, other equivalent methods or composition to these described aspects are also contemplated by the teachings herein. Therefore, the present disclosure should not be limited to any single aspect, but rather construed in breadth and scope in accordance with the appended claims.

What is claimed is:

1. A pool comprising:

a pool liner configured to contain water within an interior of the pool liner;

at least one water-resistant pocket, wherein each of the one or more water-resistant pockets is attached to an exterior of the pool liner by a portion of a re-sealable plastic seal; and an electronic accessory attachable to an interior of the at least one water-resistant pocket.

2. The pool of claim 1, wherein the at least one water-resistant pocket comprises multiple water-resistant pockets and wherein a substantially vertical side of one of the multiple water-resistant pockets is parallel to a substantially vertical side of another of the multiple water-resistant pockets.

3. The pool of claim 1, wherein the electronic accessory comprises a controller.

4. The pool of claim 3, wherein the controller comprises a receiver configured to connect to a wireless network.

5. The pool of claim 1, wherein the portion of the re-sealable pocket comprises a first strip attached to the pool liner.

6. The pool of claim 5, wherein the first strip comprises two terminal ends; wherein the pool liner comprises a unitary seam; and wherein the two terminal ends of the strip are adhered adjacent to the unitary seam.

7. The pool of claim 1, wherein the at least one re-sealable pocket comprises a channel that fits a portion of the electronic accessory.

8. A pool comprising:

a pool liner configured to contain water within an interior of the pool liner;

at least one water-resistant pocket attached to an exterior of the pool liner, wherein each of the one or more water-resistant pockets comprises a waterproof sheet and a re-sealable connector that connects the waterproof sheet and the pool liner; and an electronic accessory attachable to an interior of the at least one water-resistant pocket.

9. The pool of claim 8, wherein the at least one water-resistant pocket comprises multiple water-resistant pockets and wherein a substantially vertical side of one of the multiple water-resistant pockets is parallel to a substantially vertical side of another of the multiple water-resistant pockets.

10. The pool of claim 8, wherein the at least one water-resistant pocket comprises a first strip attached to the pool liner.

11. The pool of claim 10, wherein the first strip comprises two terminal ends; wherein the pool liner comprises a unitary seam; and wherein the two terminal ends of the strip are adhered adjacent to the unitary seam.

12. The pool of claim 10, wherein the at least one water-resistant pocket comprises a second strip attached to the pool liner.

13. The pool of claim 12, wherein the first strip is sealingly joined to the second strip by sliding a zipper mechanism in a first direction.

14. The pool of claim 10, wherein the first strip is coupled to the pool liner via a zipper.

15. The pool of claim 8, wherein the at least one water-resistant pocket comprises a folded strip attached to the pool liner.

16. A pool comprising:

a pool liner configured to be filled with water within an interior of the pool liner, wherein the pool liner is attached to a frame;

at least one water-resistant re-sealable pocket attached to an exterior of the pool liner, wherein a portion of the at least one water-resistant re-sealable pocket is located at a top of the frame; and an electronic accessory attachable to an interior of the at least one water-resistant re-sealable pocket.

17. The pool of claim 16, wherein the at least one water-resistant pocket comprises multiple water-resistant pockets and wherein a substantially vertical side of one of the multiple water-resistance pockets is parallel to another substantially vertical side of another of the multiple water-resistant pockets.

18. The pool of claim 17, wherein the electronic accessory comprises a power source.

19. The pool of claim 17, wherein the at least one water-resistant re-sealable pocket comprises a folded strip attached to the pool liner.

20. The pool of claim 19, wherein the folded strip comprises two terminal ends; wherein the pool liner comprises a unitary seam; and wherein the two terminal ends of the strip are adhered adjacent to the unitary seam.

* * * * *